Feb. 24, 1959 F. J. BERNARD 2,874,984
CONNECTOR FOR DISPLAY FURNITURE AND SCAFFOLDING
Filed May 13, 1954 4 Sheets-Sheet 1
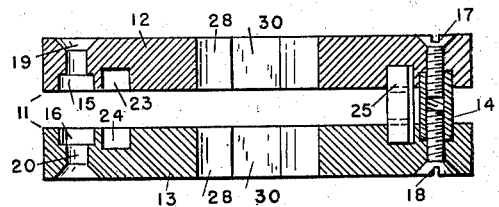
Fig. 1
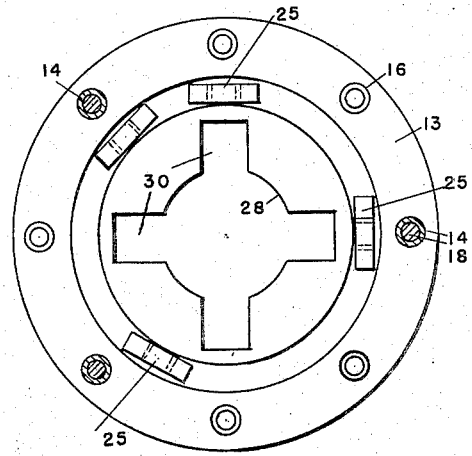
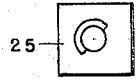 
Fig. 3  Fig. 4
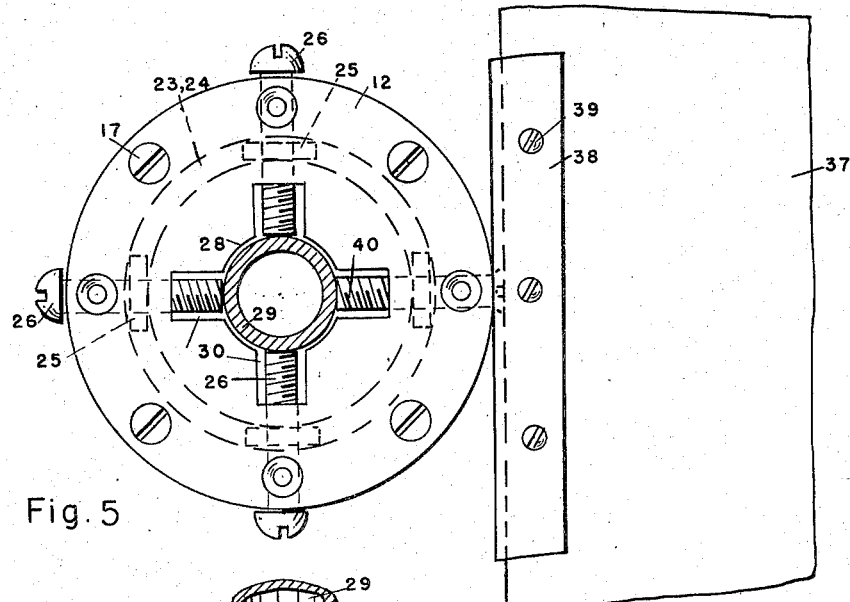
Fig. 5
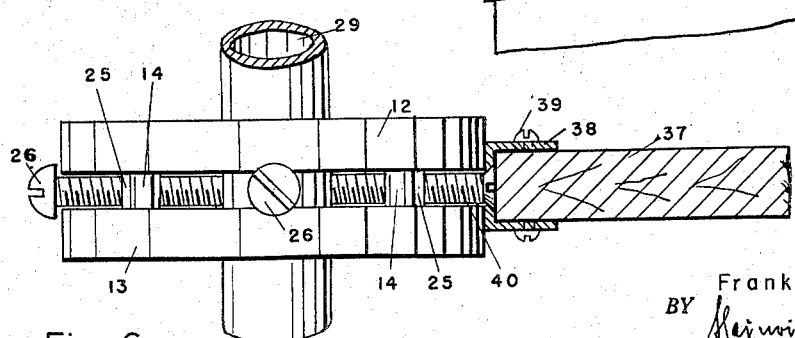
Fig. 6
INVENTOR.
Frank J. BERNARD
BY
Attorney

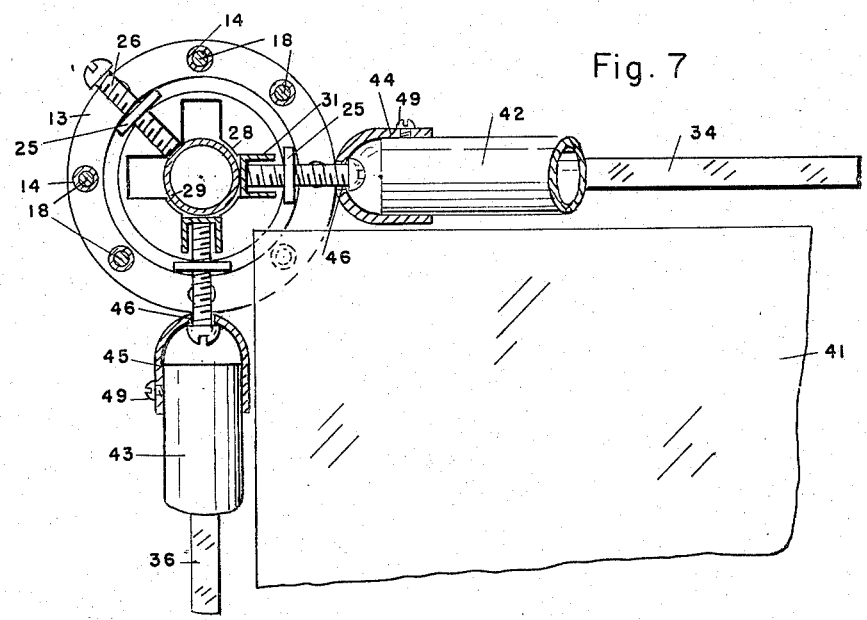
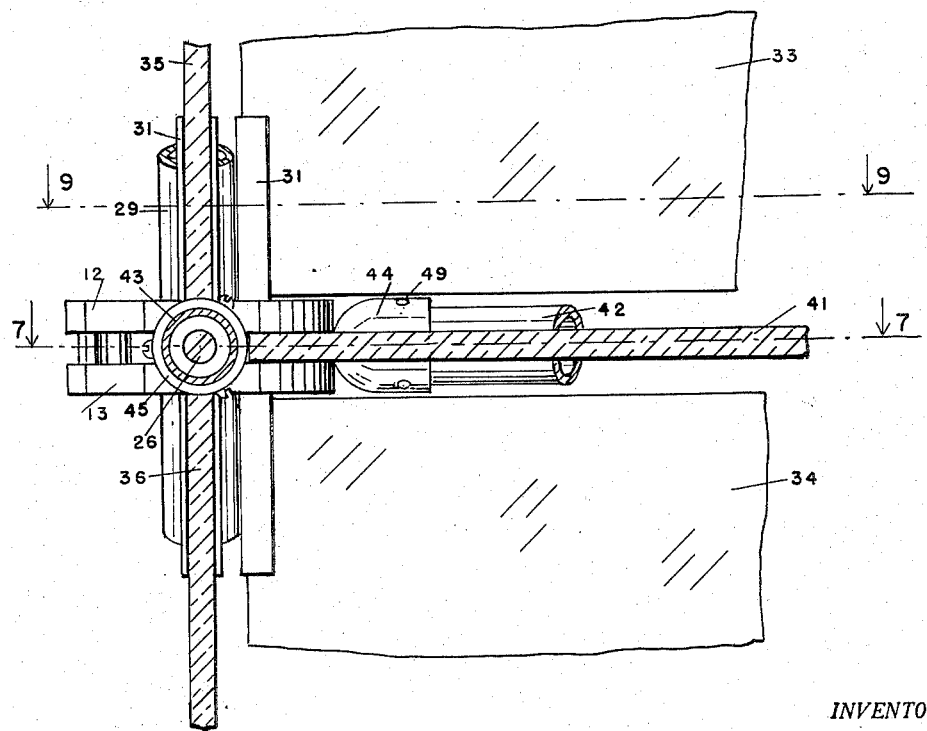

INVENTOR.
Frank J. BERNARD
BY
Attorney

Feb. 24, 1959 F. J. BERNARD 2,874,984
CONNECTOR FOR DISPLAY FURNITURE AND SCAFFOLDING
Filed May 13, 1954 4 Sheets-Sheet 4

INVENTOR.
Frank J. BERNARD
BY
Attorney

_United States Patent Office_

2,874,984
Patented Feb. 24, 1959

2,874,984

CONNECTOR FOR DISPLAY FURNITURE AND SCAFFOLDING

Frank J. Bernard, Toronto, Ontario, Canada

Application May 13, 1954, Serial No. 429,623

12 Claims. (Cl. 287—14)

The invention is concerned with a connector for display stands and shelves, cases, tables, and other furniture for store, or office, show-window, display, or other purposes.

Particularly, the invention has for its object a connector which makes possible the joining together of structural elements and the building up of furniture or display units of the aforesaid type from structural elements such as plates, panes, boards, tubes, bars, or the like, such as for the building up of corners or extensions from any combination of panels, partitions or walls, with tubes or bars as struts, ties or other re-enforcing members.

A further object of the invention is the development of a connector which makes possible the joining together of the structural elements in any desired special combination and disposition, thus when the elements are to be aligned in a straight direction or are to be joined together perpendicularly or obliquely as may be desired for the building up of such structures according to the shape and type of the elements or members to be joined.

A still further object of the connector of the invention is to make possible the rapid and effective building up of the structural elements to a sturdy and resistant structure or piece of furniture, for instance at the place of an exhibition, and the rapid dismantling of the same when the piece of furniture or display is no longer needed at that place and is to be removed and shipped. The connector of the invention, furthermore, will make it possible to change, vary, or modify, when so desired, the type or character of the structure to be built up from the structural elements joined together by the connector.

These and further features and objects of the invention will become apparent as the now ensuing specific description of the invention proceeds in which the invention will be described with reference to the accompanying drawings which form part of this specification and which by way of example illustrate an embodiment of the invention and various modes of its application for joining together structural elements. It will be readily understood, however, that the drawings are intended to be illustrative of the invention but not limitative of its scope and that the invention may be embodied in other forms without departing from the principle underlying my invention and the ambit of my appended claims.

In the drawings:

Fig. 1 is an elevational section of the disc pair which forms the connector of the invention;

Fig. 2 is a top view of the grooved inside face of one of the discs with nuts displaceable in the groove;

Fig. 3 is a side view of one of the displaceable nuts;

Fig. 4 is a longitudinal section of a threaded spacing sleeve for spacing the discs of the pair at a distance from each other;

Figure 9:
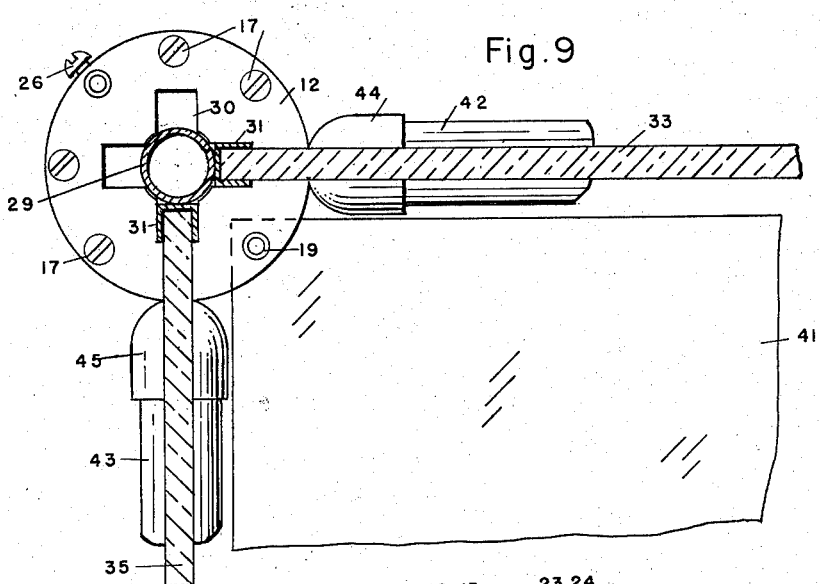
Figures 10, 12, 14:
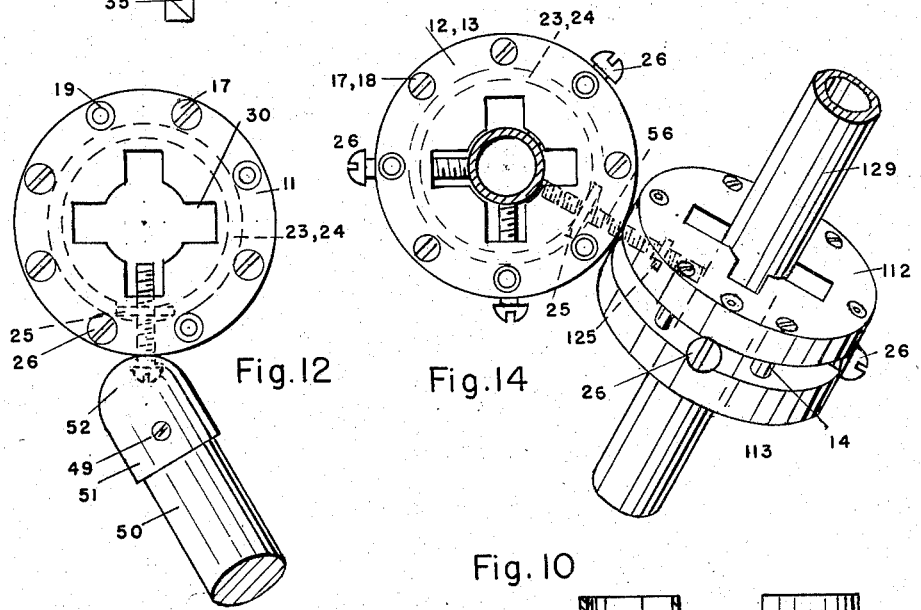
Figure 13:
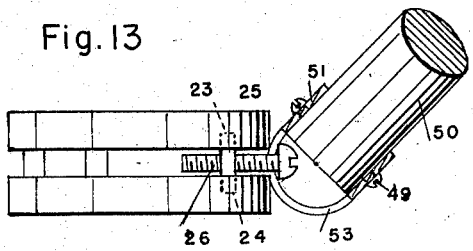
Figure 11:
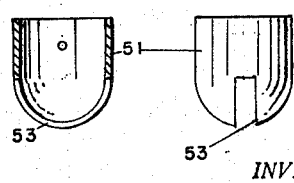
Figure 15:
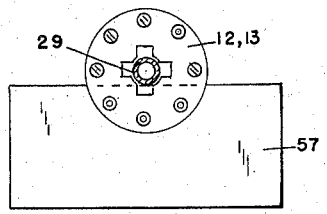
Figures 16, 17:
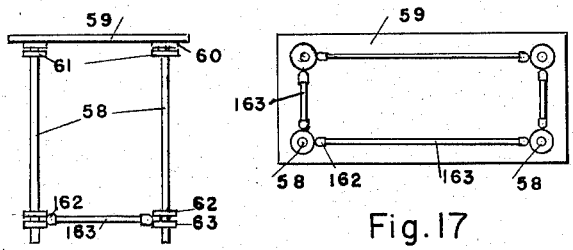
Figure 18:
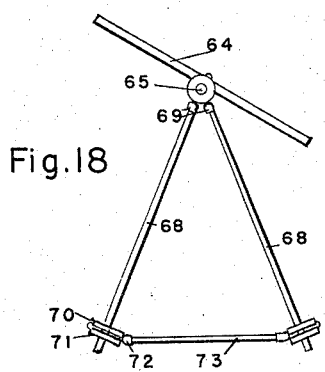
Figure 19:
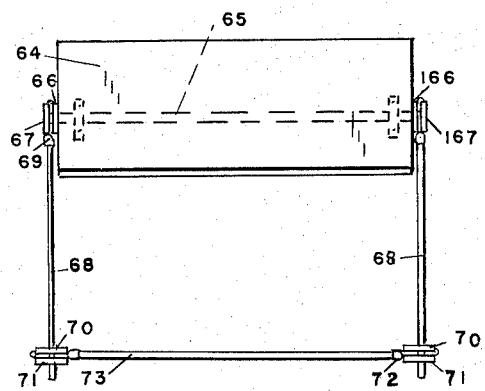
Figure 20:
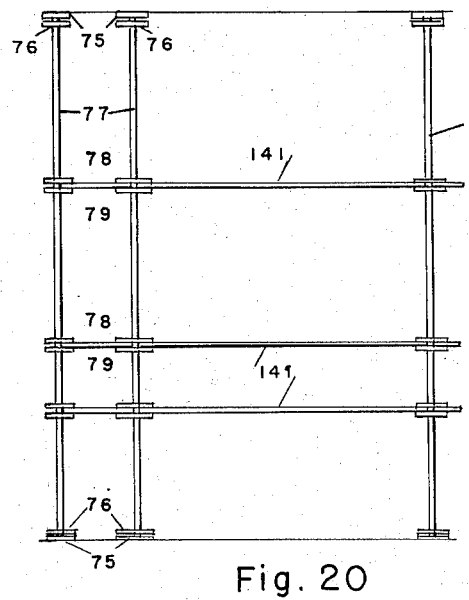
Figure 21:
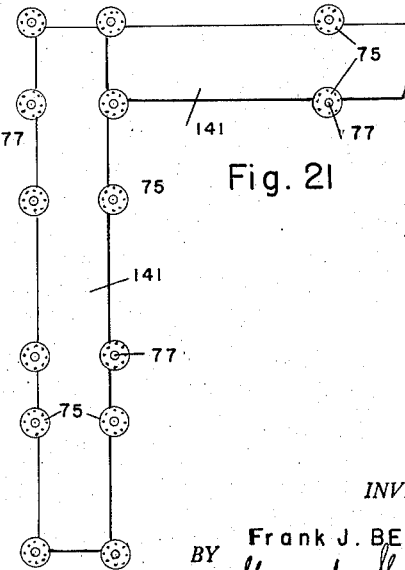

Figs. 5 and 6, respectively, are a top view and a side view of the connector applied for holding an axially extended tube and a plate or pane; the pane being shown in fractional view and section, respectively;

Figs. 7, 8 and 9, respectively, are a section along line 7—7 of Fig. 8, a side view, and a top view partly in section along line 9—9 of Fig .8 of the connector applied to the corner structure of a piece of furniture for connecting and holding together corner members, viz. struts or ties and panes or partitions;

Figs. 10 and 11, respectively, are a longitudinal section and a side view of a socket member in thimble form for attaching tubes or rods to the connector;

Fig. 12 is a top view of a connector with a strut in rod form attached to it by means of the thimble of Figs. 10 and 11, rod and thimble pointing in an oblique direction;

Fig. 13 is a side view of an arrangement similar to that of Fig. 12, with a tube attached to the connector and pointing upwards in an inclined direction;

Fig. 14 is a top view of a pair of connectors joined together as a common joint;

Fig. 15 is a top view of a plate or pane held to a tube by means of the connector of the invention;

Figs. 16 and 17, respectively, a side view and a view from below of a desk the parts of which are joined together by connectors of the invention and thimbles;

Figs. 18 and 19, respectively, are a side view and a front view of a drawing table, the parts being joined together by connectors of the invention and thimbles;

Figs. 20 and 21, respectively, are a front view and a top view of a scaffolding with shelves held together by connectors of the invention.

In the drawings, the connector is generally designated by 11. The connector comprises a body portion constituted by a pair of discs 12, 13, secured together in spaced relationship by spacing means such as by means of sleeves 14. The sleeves are held in position by conformably dimensioned sockets 15, 16 shaped in the inside faces of discs 11, 12, and opposite each other. The axial depth of these sockets is so dimensioned relatively to the length of the sleeves that the discs are spaced apart from each other the desired distance. The sleeves 14 are provided with inside threads, Fig. 4, for co-operation with screws 17, 18. Bores 19, 20, for the securing screws 17, 18, respectively, are provided in the discs, coaxially with the sockets 15, 16, for the spacing sleeves 14. Bores and sockets are distributed peripherally about the discs in any desired number, such as eight as illustrated, preferably evenly, or otherwise whenever conditions so require.

As a rule, sockets and appertaining screw pairs need not be inserted into all these sockets and bores, a smaller number, appropriately distributed over the circumference, such as three or four for instance, will suffice.

Both discs 12, 13, are each shaped at their inside faces, and opposite each other with a circular, closed groove 23, 24, respectively, of rectangular shape. Nuts 25, of any number, may be disposed loosely and circumferentially displaceable within these grooves.

These nuts are of a width generally corresponding to the distance from bottom to bottom of the grooves, while the outer diameter of their screw threads corresponds to or is rather slightly smaller than the width of the spacing between the discs. In order to prevent the nuts from turning, they are conveniently of square form, as Fig. 3 illustrates.

Screw bolts 26, as illustrated in the various examples, may be passed through these nuts and radially through the interspace between the discs 12, 13. By means of these screw bolts construction elements of various types for the building up of pieces of furniture may be secured to the connector and thus the one to the other, as exemplified in the drawings.

The discs, as Figs. 1, 2, 5, 7, 9 and 12, illustrate, may be provided with center bores 28, conveniently cylindrical, or if desired of other shape. An axially disposed tube 29 or bar may be extended through these bores 28 and clamped in position by means of screws 26 passed through the nuts 25 which screws, while clamping tube 29, press the nuts against the outer circumferences of the circular grooves 23, 24.

For the attachment of other or further structural members, rectangular cut-outs 30 may be provided in the discs, outwardly extended from the center bores 28, as Figs. 2, 5, 7, 9 and 12 illustrate. Channel bars 31 may be extended through the cut-outs 30 and held in position by being clamped through the screws 26 against the center tube 29 or bar. The channel bars in their extension above the discs or below the discs or both, may then hold or frame plates, panels, partitions or panes such as illustrated at 33, 34 and 35, 36 in Figs. 7 to 9.

The channels of the channel bars need not face radially outwards as Figs. 7 and 9 illustrate, they may also be turned to face sidewards, or to face inwards towards the center. If no center bar or tube is employed, the channel bars, in any position of the channel, may also be clamped against the bottom wall of the cut-out by longer screws 26 passed through the interspace of the disc pair and through a nut at the diametrally opposite side of the disc pair. A great variety of positions and mutual dispositions of structural elements to be attached to the connector are thus made possible. A still greater variety in the mode of employing the connector is achieved through the use of the perimeter of the connector as abutment or support of members which, by means of screws 26 radially extended through the interspace between the discs 12 and 13 and through the nuts 25, are held or clamped against the perimeter of the discs. Through proper displacement around the circular grooves 23, 24, these members may be applied to the connector in any desired disposition, as to direction and inclination.

In the embodiments illustrated, holding members are employed for holding the plates, panes, panels, or partitions and the ties or struts at the perimeter of the connector discs.

In the case of a plane member, such as a pane or partition 37 to be held at the perimeter of the disc pair, a channel bar 38 may be employed as a socket member to hold or frame therein the edge of the pane 37, Figs. 5 and 6. The position of pane 37 within channel bar 38 may be secured, if desired, by clamp screws 39. A screw 40 of proper length together with a nut 25 may be employed for clamping the channel bar 38 and at the same time the center tube 29 or bar against the connector. The clamping of the center tube 29 may be assisted through one or more additional screws 26, for instance three as illustrated in Figs. 5 and 6, distributed over the circumference of the connector. Since in this example, channel bar 38 is held by a single screw 40, bar 38 with its pane 37 may be secured at the connector at any desired angle by adjusting channel bar 38 with its pane 37 to the proper inclination relatively to the disc pair 12, 13.

Plates may also be clamped between the discs 12, 13, of the connector, as illustrated in Figs. 7 to 9 where a corner of a plate 41 occupies nearly a quarter of the circle between the discs. The plate might also be extended through half the circle between the discs. Plate 41, if desired, might be provided with a bore through which the spacing sleeve 14 with its pair of securing screws 17, 18 may be passed.

The socket member for holding tubes such as 42, 43, or bars such as 50, Fig. 12, at the connector, is illustrated as a thimble 44, 45. The head of the thimble may be flat, or as Figs. 7 to 13 illustrate hemispheric with a bore 46 at its head for passing therethrough the shaft of a clamping screw 26. The tubes or bars may be secured in the thimble by means of clamp screws 49 screwed through the thimble and thus pressing against the end of the tube or bar inserted into the thimble.

The thimbles with the tubes may be secured to the connector while pointing in any desired direction, simply by properly adjusting the appertaining nut 25 in the grooves 23, 24.

Figs. 7 to 9 illustrate how by combination of these means a corner of a piece of furniture may be joined together by the connector of the invention. The figures illustrate a corner comprising five plates 33, 34, 35, 36, and 41 and three struts or ties 29, 42 and 43.

Other combinations to be joined together by the connector of the invention are readily feasible.

Figs. 10 and 11 illustrate an embodiment where the hemispherical head 52 of the thimble 51 is provided with a slot 53 extended over a greatest half-circle of the head. Owing to the slot, through which the shaft of a clamping screw is passed, the thimble may be secured at any desired angle of a hemisphere to the connector. Struts or ties, bars or tubes, joined to the connector may thus project therefrom in nearly any desired direction of a half-sphere, upwards, downwards or sidewards from the radial direction, as exemplified in Figs. 12 and 13.

Two or more connectors may also be joined together, for instance when it is desired to connect two or more tubes or bars, extended in both directions through the common joint.

In the embodiment illustrated in Fig. 14, two connectors, 12, 13, and 112, 113, are joined together, for instance by means of a screw 56 passed through nuts 25 and 125 disposed and slidable within circular grooves 23, 24, of both disc pairs 12, 13, and 112, 113. Screw 56 is of a length such as to bear with its ends against tubes 29 and 129, respectively, the screw to this purpose being without head and threaded through its length.

Through this arrangement, the connectors may be joined in any desired angular and peripheral position relatively to each other. The tubes or bars 29, 129, may be further secured to the connectors by means of screw bolts 26 and nuts 25, 125, in proper number, as has been described hereinabove. Additional structural elements may be secured to both connectors in the same way as has already been exemplified with a single connector.

Fig. 15 illustrates a plate or tablet 57 held at a tube 29 by means of the disc pair 12, 13, of a connector. The plate, instead of occupying nearly a quadrant of the interspace between the disc pair as shown in Figs. 7 to 9 with regard to plate 41, here occupies nearly a half-circle of the interspace.

Figs. 16 to 21 illustrate examples where connectors of the invention are applied to pieces of furniture and to a scaffolding, whose parts are thus held together.

In the case of a table or desk, Figs. 16 and 17, the legs 58 may be secured from underneath to the plate 59 by means of connector disc pairs 60, 61, which while secured to the legs 58 by means of screw bolts 26 and nuts 25, simultaneously serve as securing flanges, the upper one of the discs or both discs being screwed to the plate 59. Vacant bores 19 may be employed to this purpose while other bores serve to receive the spacing sleeves 14 and screws 17, 18, as described with reference to Figs. 1 and 2. Connectors 62, 63, through the center bores of which the legs 58 are passed, hold by means of thimbles 162 the cross bars 163, thus re-enforcing the legs.

Figs. 18 and 19 illustrate diagrammatically a table such as a drawing table with a pivotal plate 64. The plate is secured to a bar or tube 65 which is passed axially into or through connectors 66, 67, and 166, 167, and is held therein by means of screw bolts 26 passed through nuts 25 disposed within the circular grooves 23, 24 of the disc pair, as shown in Figs. 5 and 6 with reference to tube 29.

On loosening the screw bolts 26 which press against tube 65, plate 64 may be pivoted into any desired angle and thereon secured in this position by tightening again the screw bolts 26.

By means of thimbles 69, such as described in detail with reference to Figs. 7 to 13, the legs 68 of the table are secured to the connectors 66, 67, and 166, 167, while further connectors 70, 71 and thimbles 72 serve for securing the ties 73 to the legs 68.

Figs. 20 and 21 illustrate the application of the connector of the invention to a display scaffolding. For holding or securing the posts 77 at the ceiling and the floor of the room or store, connectors 75, 76, respectively, may be employed as flanges. Intermediate connectors 78, 79, are secured by screw bolts 26 and nuts 25, similar as described with reference to Figs. 5 to 9, to the posts 77 and may hold the shelves 141 at the desired heights, in the manner shown in Figs. 5 and 6 with reference to plate 37 or in Figs. 7 to 9 with reference to plate 41. Rear and front wall as well as partitions may also be joined to the scaffolding in the manner as shown with reference to plates or panes 33, 34, 35, and 36 in Figs. 7 to 9. In the same manner also other types of furniture and display scaffolding may be built up, such as pane or panel holders where plates, panes, or panels are held between posts, fixed at or pivotal about any vertical, horizontal or otherwise inclined axis; dress stands, floor or table lamps, or the like, display scaffolding or shelves, show cases, display windows, and others.

It will thus readily be seen from these examples that a great variety of furniture pieces may be built up by the employ of connectors of the invention, be it as a permanent structure or scaffolding, or a structure or scaffolding readily to be built up or dismounted or knocked down, for stores or offices, for store and window display, exhibition and convention display, for storage, or other purposes.

I claim:

1. Connector for joining together tubes, bars, plates, panes, partitions, shelves, and the like structural elements to be extended in various directions for the building up of display furniture and scaffolding, said connector comprising a pair of loose discs, each of said discs shaped with a circular, closed groove facing the interspace between said discs and in opposition to each other, in combination with detachable securing and spacing means radially spaced from the center parts of said discs and distributed about the perimeter of the discs for detachably securing said discs with and in spaced relationship to each other, a plurality of nuts disposed within said grooves, reaching from bottom to bottom thereof and dimensioned so as to be loosely and circumferentially displaceable therealong when said discs are secured together in said spaced relationship, the outer diameter of the screw threads of the nuts being at most slightly smaller than the width of the spacing between said discs, a plurality of bolts passed radially through the space between the discs and through the nuts, to secure said structural elements, radially detachable, to said disc pair while holding said nuts peripherally in position by pressing them against one of the side walls of the grooves through the tightening of the bolts, said means for securing the discs in spaced relationship to each other comprising spaced sleeves with inside screw threads, sockets dimensioned conformably to said sleeves being shaped in the inside faces of said discs, opposite each other, for positioning said sleeves therein, and screws associated with said sleeves, a pair of screws with each sleeve, said pair of screws adapted to be screwed from both outside faces of the discs into the spacing sleeve associated therewith.

2. Connector as set forth in claim 1 wherein said spacing sleeves with their screws and sockets are disposed on a circle around said circular grooves.

3. A connector for joining structural elements to be extended in various directions comprising a body having an internal trackway opening to the perimeter of the body through a reduced passage, a holder for a structural element, and means for clamping said holder to the perimeter of said body in adjusted positions along said trackway, said clamping means comprising a nut and a bolt having a threaded shank and a head, said nut being slidably received in said trackway and extending into said trackway at each side of said reduced passage, said bolt having its head overlying said holder and extending beyond each side of said reduced passage at the perimeter of said body and having its shank extending through an opening in said holder and through said reduced passage and threadably engaging said nut in said trackway, said bolt on threading into said nut acting to draw said nut outwardly towards the perimeter of said body against the wall of said trackway either side of said reduced passage, and to draw said bolt head inwardly towards the perimeter of said body to clamp said holder thereto.

4. A device as claimed in claim 3 in which said holder is revolvably supported by said bolt shank to rotate to adjusted angular positions about said bolt shank.

5. A device as claimed in claim 4 in which said holder comprises a channel member adapted to receive a planar structural element, and clamp means carried by said holder.

6. A device as claimed in claim 4 in which said holder comprises a socket member having a part spherical surface disposed in abutting relation to the perimeter of said body.

7. A device as claimed in claim 6 in which said socket is formed with an elongated slot in said part spherical surface and said bolt shank extends through said elongated slot.

8. A connector for joining structural elements to be extended in various directions comprising a circular body having an annular internal trackway opening to the periphery of said body through a reduced circumferentially extending passage, a holder for a structural element, and means for clamping said holder to the periphery of said body in adjusted positions along said trackway, said clamping means comprising a nut and a bolt having a threaded shank and a head, said nut being slidably received in said trackway and extending into said trackway at each side of said reduced passage and said bolt having its head overlying said holder and extending beyond each side of said reduced passage at the periphery of said body and having its shank extending through an opening in said holder and through said reduced passage threadably engaging said nut in said trackway, said bolt on threading into said nut acting to draw said nut outwardly towards the periphery of said body against the wall of said trackway either side of said reduced passage, and to draw said bolt head inwardly towards the periphery of said body to clamp said holder thereto.

9. A connector for joining structural elements to be extended in various directions comprising a circular body portion formed to provide an internal annular trackway opening at its outer periphery through a reduced passage to the periphery of said body, at least one nut disposed in said trackway for circumferential adjustment, and having its threaded orifice exposed to the periphery of said body through said passage, at least one holder member for a structural element disposed at the periphery of said body, a bolt passing through said holder and extending radially into said reduced passage and threadably engaging said nut, said holder, bolt and nut being adjustable as an assembly peripherally of said body on movement of said nut in said annular trackway, and said bolt being adapted on threading through said nut to clamp said holder in peripherally adjusted position against the periphery of said body and to draw said nut radially outwardly against the wall of said annular trackway on either side of said reduced passage to lock said holder in peripherally adjusted position.

10. A connector for joining structural elements comprising a circular body formed by a pair of discs held in fixed spaced relation, each of said discs having an annular groove in the face thereof facing the interspace between the discs, said grooves being disposed in opposing registration to define an annular trackway and the spacing between said discs forming a reduced circumferentially extending passage leading from said trackway to the periphery of said body, a holder for said body, and means for clamping said holder to the periphery of said body in adjusted positions along said trackway, said clamping means comprising a nut and a bolt having a threaded shank adapted to threadably engage said nut and a head, one of said nut and said bolt head being slidably received in said trackway and extending into said trackway at each side of said reduced passage and the other overlying said holder and extending beyond each side of said reduced passage at the periphery of said body, said threaded bolt shank extending between said head and nut through an opening in said holder and through said reduced passage to said trackway, said bolt on threading into said nut acting to draw the one of said nut and bolt head outwardly towards the periphery of said body against the wall of said trackway either side of said reduced passage, and to draw the other of said nut and bolt head inwardly towards the periphery of said body to clamp said holder thereto.

11. A device as claimed in claim 10 in which said discs which constitute said body have registering centrally disposed openings extending therethrough perpendicular to their planes, and a structural element is disposed to extend through said registering openings, and means for clamping said body to said structural element comprises a nut corresponding to the aforesaid nut arranged in said trackway, and a bolt corresponding to the aforesaid bolt threadably engaging said nut and having its shank end engaging said structural element.

12. A structural assembly comprising a circular body having a central opening, a structural member slidably received in said body, means clamping said body in adjusted positions on said structural member, said body having an annular internal trackway opening to the periphery of said body through a reduced circumferentially extending passage, a holder for a structural element, and means for clamping said holder to the periphery of said body in adjusted positions along said trackway, said clamping means comprising a nut and a bolt having a threaded shank adapted to threadably engage said nut and a head, said nut being slidably received in said trackway and extending into said trackway at each side of said reduced passage and said bolt having its head overlying said holder and extending beyond each side of said reduced passage at the periphery of said body and having its shank extending through an opening in said holder and through said reduced passage and threadably engaging said nut in said trackway, said bolt on threading into said nut acting to draw the said nut outwardly towards the periphery of said body against the wall of said trackway either side of said reduced passage, and to draw the said bolt head inwardly towards the periphery of said body to clamp said holder thereto, and a structural element secured in said holder.

References Cited in the file of this patent
UNITED STATES PATENTS

| | | |
|---|---|---|
| 684,451 | Mowry | Oct. 15, 1901 |
| 1,128,793 | Kobbe | Feb. 16, 1915 |
| 1,358,159 | Kern | Nov. 9, 1920 |
| 1,679,758 | Bauersfeld | Aug. 7, 1928 |
| 2,163,315 | Dalrymple | June 20, 1939 |
| 2,546,043 | Parmenter | Mar. 20, 1951 |
| 2,715,537 | Hofheimer | Aug. 16, 1955 |